Jan. 3, 1967  K. L. CAPPEL  3,295,224
MOTION SIMULATOR

Filed Dec. 7, 1964  6 Sheets-Sheet 1

INVENTOR:
KLAUS L. CAPPEL
BY Howson & Howson
ATTYS.

Jan. 3, 1967 K. L. CAPPEL 3,295,224
MOTION SIMULATOR
Filed Dec. 7, 1964 6 Sheets-Sheet 4

INVENTOR:
KLAUS L. CAPPEL
BY Howson & Howson
ATTYS.

Jan. 3, 1967 K. L. CAPPEL 3,295,224
MOTION SIMULATOR
Filed Dec. 7, 1964 6 Sheets-Sheet 6

INVENTOR:
KLAUS L. CAPPEL
BY Howson & Howson
ATTYS.

United States Patent Office 3,295,224
Patented Jan. 3, 1967

3,295,224
MOTION SIMULATOR
Klaus L. Cappel, Marlton, N.J., assignor to The Franklin Institute, Philadelphia, Pa., a corporation of Pennsylvania
Filed Dec. 7, 1964, Ser. No. 416,371
5 Claims. (Cl. 35—12)

The present invention relates to a motion simulator and, more particularly, to an improved motion simulator for producing fore and aft, lateral, elevational, roll, pitch and yaw movements, or any combination of such movements.

The present invention is concerned primarily with dynamic simulators in which the component parts are connected and actuated by rigid elements, such as linear actuators or the like. In such systems, dynamic simulators are classified according to the extent to which motion of the components producing displacement in any of the six degrees of freedom is achieved. The six degrees of freedom comprise three mutually perpendicular axes of linear movement and three axes of rotational movement, one of the axes being normal to the other two. The dynamic simulator of the present invention belongs to that class of linear-actuated dynamic simulators which employs a coupled system for producing movement of the platform, that is, movement is achieved by coupled forces produced by the linear actuators as opposed to a combination of superimposed pure translational or rotational movement with the possibility that movements may occur requiring only one of the actuators, with all other actuators unaffected.

In the prior art of linear-actuated coupled-motioned dynamic simulators in an advanced preferred embodiment, a platform or table is supported by three vertically-extending linear actuators with three horizontally-positioned linear actuators, all of which are extensible for simulation of movement of the platform. The vertical groups of actuators in addition to supporting the platform primarily produce vertical linear translation and pitch and roll motions of the platform, and the horizontal group of actuators are typically positioned at adjacent corners of the platform for stabilizing the platform and producing linear movement in two directions and yaw movement. As a result of this arrangement of the horizontal linear actuators, the support base area of the motion simulator has been very large and the vertical columns which support the horizontal actuators have by necessity been very large, requiring a massive foundation to provide the rigidity to insure accurate response to command signals extending the actuators and to provide a reference frame for the platform which is immovable. The cost of the foundation of these prior art simulators has comprised a considerable portion of the total cost of the simulator. Moreover, because of the massiveness of the foundation, the simulator has not been movable to different locations.

The linear-actuated coupled-motion dynamic motion simulator of the present invention is far more flexible in its use than simulators of the prior art. In accordance with the present invention, the platform provides three points in one plane and the support base provides three points in another plane such that the points on the base and the platform define the vertices of triangular faces of an octahedron. The platform is supported above the base by six powered and controlled linear actuators connecting each of the three points on the support base with two adjacent points on the platform, whereby the linear actuators and lines in the platform and support base, respectively, drawn between the points of connection, all define the edges of the triangular faces of the octahedron. This truss arrangement of connecting the linear actuators between the platform and support base without sacrifice of freedom of movement provides a greater compactness and rigidity of the system than heretofore provided in prior art motion simulators. Great economy also results from the simulator's much smaller foundation supporting the actuators with no massive lateral support columns required for necessary rigidity. The much smaller foundation required by the present invention permits a structure which is not only less expensive to build but also so light in weight that it may be made easily portable, i.e., capable of having the structure as fabricated moved to different locations. The great compactness of the simulator results also in a saving of space at the location where the simulator is used.

For a better understanding of these and other features and advantages of the present invention, reference is made to the following detailed description and the accompanying drawings, in which.

Figure 1:
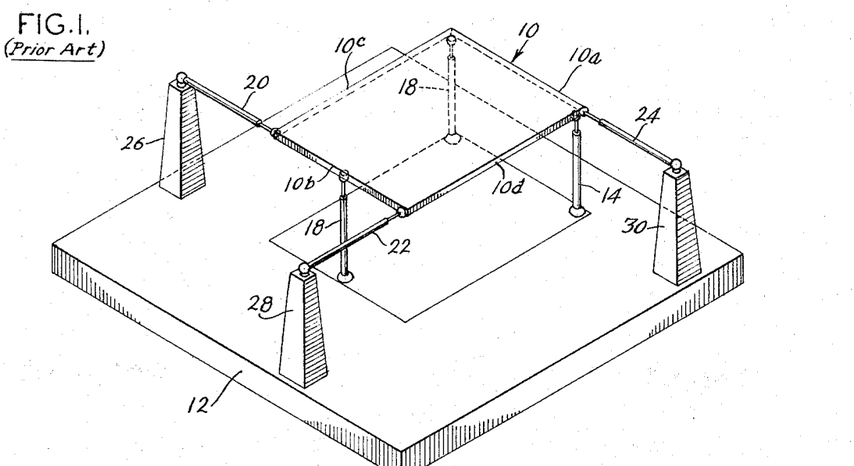
FIG. 1 is a perspective view of a typical prior art motion simulator.

Referring first to FIG. 1, a typical prior art motion simulator is schematically represented therein. This linear-actuated coupled-motion prior art simulator has a rectangular-shaped platform 10 supported above a base foundation 12. The platform may be used as shown for helicopter flight simulation and the like, or may support a capsule or the like for simulation of movement as would be experienced in space flight. The platform 10 is generally supported above the rectangular-shaped foundation 12 by means of three vertical linear actuators 14, 16 and 18 positioned beneath the platform, actuators 14 and 16 being positioned at adjacent corners of edge 10a of the platform and actuator 18 being positioned intermediate the ends of opposite edge 10b of the platform, for example. Actuators 14, 16 and 18 are primarily responsible for vertical linear movement and pitch and roll movements of the platform.

Other movements of the platform are accomplished primarily by means of horizontal linear actuators 20, 22 and 24 applying force at various corners of the platform 15 along edges thereof, actuator 20 applying force at the intersection of edges 10b and 10c and parallel to edges 10b, actuator 22 applying force at the intersection of edges 10b and 10d and parallel to edges 10d, and actuator 24 applying force at the intersection of edges 10a and 10b and parallel to edge 10a. Each of the horizontal actuators 20, 22 and 24 are supported at their outwardly extending ends by means of large rigid columns 26, 28 and 30, respectively, made of steel reinforced concrete and supported on a massive foundation 12 also made of reinforced concrete. The columns 26, 28 and 30 must be very large and massive to preclude any movement, due to the thrust of the actuators, which might modify the reference frame of the platform. The large columns and platform have involved an expense which has been a considerable portion of the cost of the simulator and have precluded any possibility of portability of the simulator.

Figure 2:
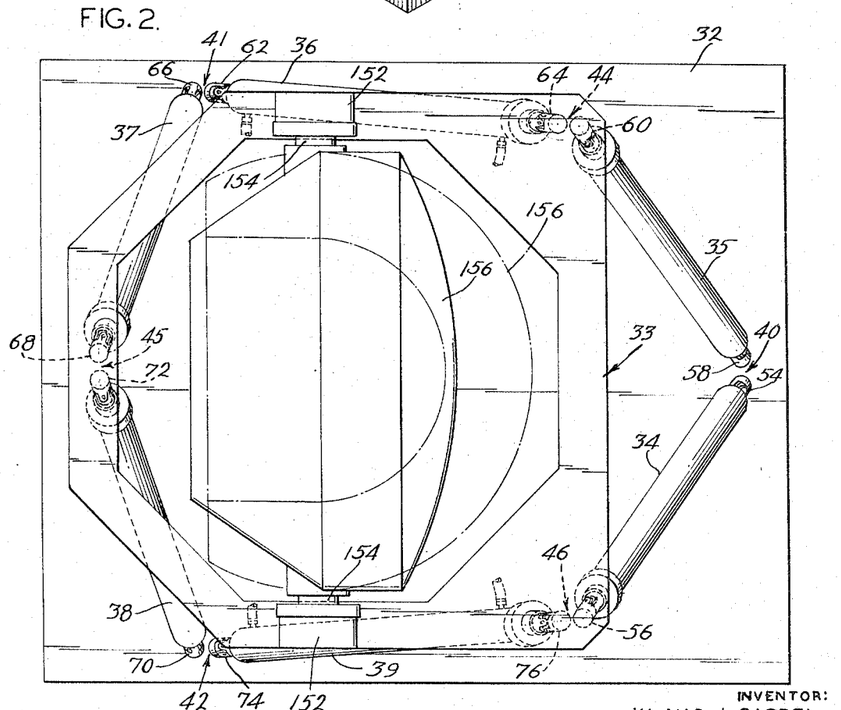
FIG. 2 is a plan view of the motion simulator of the present invention.
Figure 3:
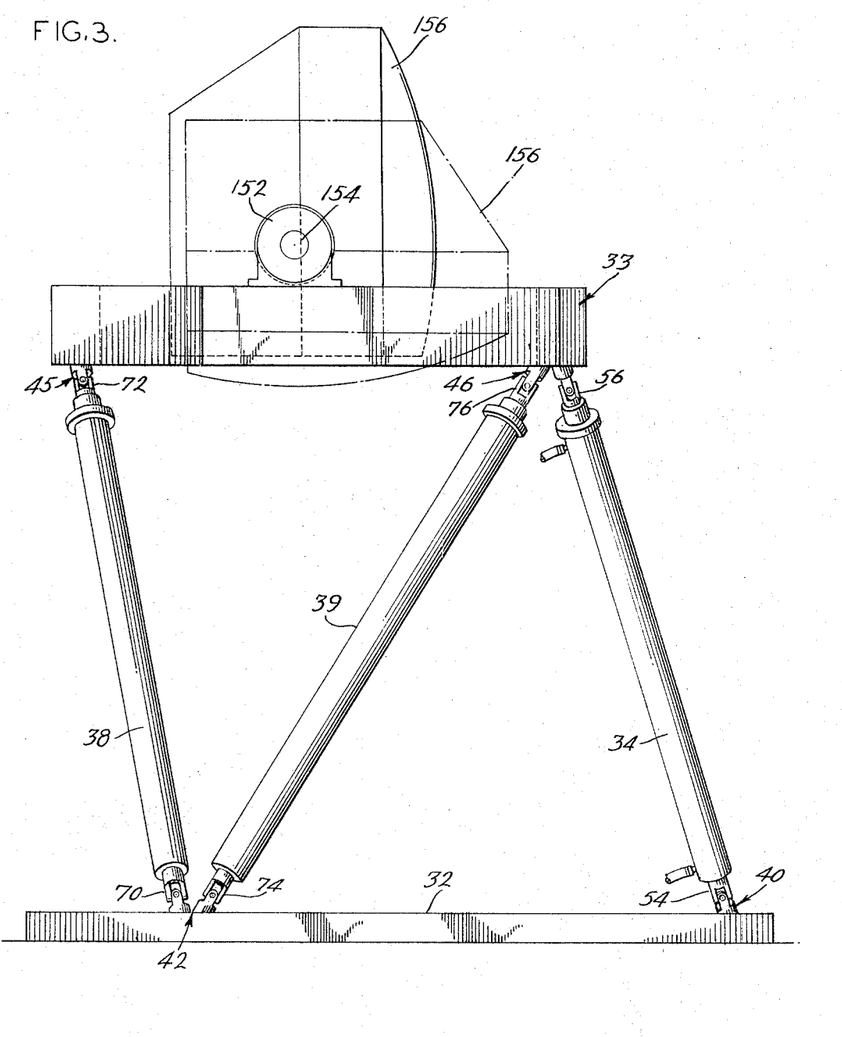
FIG. 3 is a side elevational view of the motion simulator of the present invention showing the platform providing a gimbal mount for a capsule rotatable about its support axes and showing the capsule in full lines in its upright position and dashed lines when rotated 90° about the support axes.
Figures 4, 5:
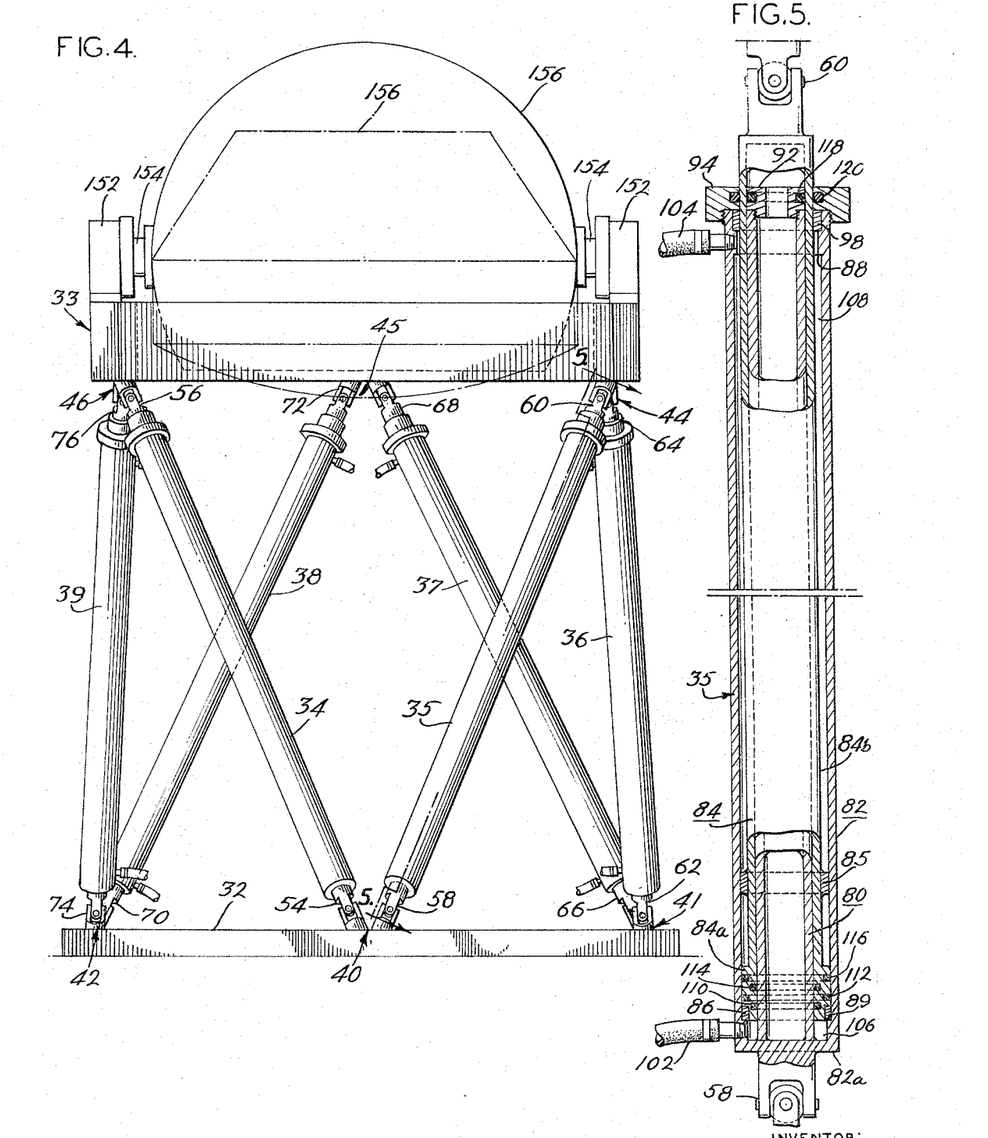
FIG. 4 shows a front elevational view of the embodiment of the invention of FIG. 3.
FIG. 5 is a sectional view taken along line 5—5 of FIG. 4.

In contrast to the prior art, the persent invention, as shown in FIGS. 2, 3 and 4, may have a support base 32 with only slightly large surface area than platform 33 supported thereabove. Also, each of the six linear extensible actuators 34, 35, 36, 37, 38 and 39 are mounted to extend between the support base and the platform. More specifically, the support base provides three support points 40, 41 and 42 and the platform provides three support points 44, 45 and 46. In practice the so-called "points" are areas and usually two closely spaced areas. However, it will be understood that such areas are preferably placed as closely together as possible, and "points" as used herein include areas not spaced as closely as possible but whose spacing does not preclude the functioning described hereafter. The relative positions of the points in the support base and platform, respectively, are such that they define vertices of a hexagon when projected on one of the planes, as can be seen in FIG. 2.

The six extensible actuators 34, 35, 36, 37, 38 and 39 are connected between adjacent points on the platform and support base, actuator 34 between points 40 and 46, actuator 35 between points 40 and 44, actuator 36 between points 44 and 41, actuator 37 between points 41 and 45, actuator 38 between points 45 and 42, and actuator 39 between points 42 and 46. The arrangement of the simulator is such that the actuators lie on the lines between points in the platform and support base which define edges of an octahedron having only triangular faces. Each pair of actuators connected at one of the points on the support base 32 or platform 33 is offset slightly from being mounted both at the exact same point due to the inherent limitation of space, size of the actuators and angle at which each meets the respective base and platform. It is desirable to have the actuators of each pair connected at each point offset from one another the least amount possible, i.e., attached as closely to the same point as possible, in order to minimize the external forces applied along the actuators. Otherwise, if the actuators at each point are offset from one another any substantial amount, bending in the connections adjacent the platform and base will occur and toggle effects will be set up. In addition increased spacing between the pair of actuators will cause deflection in the structure and set up additional unwanted forces acting on the actuators.

As can be seen in FIGS. 4 and 5, each of the linear-extensible actuators 34, 35, 36, 37, 38 and 39 is provided with two universal joints, one adjacent each end at the mounting of the actuator to the base 32 and platform 33, respectively. Actuator 34 has universal joints 54 and 56; actuator 35 has universal joints 58 and 60; actuator 36 has universal joints 62 and 64; actuator 37 has universal joints 66 and 68; actuator 38 has universal joints 70 and 72; and actuator 39 has universal joints 74 and 76. The shafts supporting the universal joints are aligned axially with the respective actuators to which they are coupled.

FIG. 5 illustrates a sectional view of linear actuator 35, which is representative of all six of the actuators. In accordance with the present invention in providing a simple, light-weight and highly flexible system, the actuator 35 comprises an inner cylindrical tubular sleeve 80 and a coaxial outer cylindrical tubular sleeve 82, sleeve 80 being secured to the flat circular end 82a of outer tube 82. Slidably supported between the inner sleeve and outer sleeve is a coaxial telescopic cylindrical tubular piston member 84 which may be extended and retracted to provide the effective linear extension and contraction of the actuator. The telescopic cylindrical piston member 84 has a piston head portion 84a at the bottom thereof with a wall thickness of slightly smaller dimension than the spacing between the outer diameter of inner sleeve 80 and the inner diameter of outer sleeve 82, and the wall thickness of the rest of the tubular piston member comprising piston sleeve 84b is reduced from that of the piston head. The piston member is slightly longer than the inner and outer sleeves, and fits over the outer diameter of the inner sleeve. Fixedly located along the outer diameter of the lesser wall thickness sleeve 84b of piston member 84 and along the lower portion of the piston member is a bearing stop ring 85, having a wall thickness slightly less than the distance between the outer diameter of the piston sleeve 84b and the inner diameter of outer sleeve 82. A second bearing stop ring 86 is provided adjacent the bottom of piston head 84a in a groove along outer diameter of the piston head provided therefor. The bearing stop rings 85 and 86 limit the upward and downward movement of the piston sleeve 84b, respectively, by abutment against stops 88 and 89, respectively. Stops 88 and 89 are provided by inwardly projecting flanges around the inner diameter of outer sleeve 82 adjacent the top and bottom thereof. The distance between the bearing stop rings 85 and 86 associated with the piston member is sufficient to provide stability and rigidity of the actuator when the piston member is telescoped to maximum extension. The bearing stop rings 85 and 86 serve to resist lateral forces between the piston 84 and outer sleeve 82 and the stop rings provide guidance of the piston member.

The upper end of inner sleeve 80 has annular cap 92 firmly seated thereon by, in the present instance, screwing a threaded tubular flange of the cap inside an internally threaded portion of inner sleeve 80. The upper end of outer sleeve 82 is also provided with an annular cap 94, having an annular internally threaded flange portion screw over a threaded portion along the outside of outer sleeve 82. The outer diameter of annular cap 92 and the inner diameter of annular cap 94 snugly accommodate sleeve 84b in a sliding fit. Also located at the upper end of outer sleeve 82 along the inner diameter thereof is a bearing ring 98 press fitted therein and abutting against the upper side of stop 88. The piston member 84 slides between bearing ring 98 and the inner sleeve for support at the upper end of the inner and outer sleeves.

As previously explained, each actuator is provided with a universal joint at each end thereof through which they are coupled to the base 32 and platform 33. As can be seen in FIG. 5, which is a typical showing of the actuators, the universal joints 58 and 60 associated with actuator 35 are coupled to the actuator at lower end 82a of outer sleeve 82 and at the upper end of piston sleeve 84b, respectively.

The extension and retraction of the linear actuators is accomplished by means of a hydraulic system to be explained hereafter. The fluid pressure is supplied to the actuators through hoses, one adjacent each end of the outer sleeve. More particularly, as shown in FIG. 5, a hose 102 is secured to a hose connection fitting adjacent the bottom of outer sleeve 82 so that fluid enters the cylinder formed by sleeves 80 and 82 slightly below the abutment surface of stop 89. A second hose 104 is connected by a suitable fitting adjacent the top of outer sleeve 82 so that fluid enters sleeve 82 slightly above the abutment surface of stop 88. When the piston member is to be telescoped, fluid is fed through hose 102 into the lower chamber 106 between the inner and outer sleeves, thereby exerting pressure against the bottom of piston head 84a forcing the piston member upward. The distance the piston member is telescoped depends on the amount of fluid introduced which may be a function of time. In the preferred manner of operating the actuators during extension of the piston member, as the fluid flows into the lower chamber 106, fluid flows out of the upper chamber 108 through hose 104 and through the hydraulic system for filling the lower chamber. In order to prevent fluid passage around the piston head 84a resulting in loss of motive force, O rings 110, 112, 114 and 116 are staggered in circumferential grooves alternately opening inwardly and outwardly along the inner and outer diameters of the piston head. The O rings which bottom in the groove also extend beyond the surface in which the groove is formed and against the outer face of inner tubular sleeve 80 and against the inner face of outer tubular sleeve 82, respectively. As an alternate arrangement, O rings 110 and 114 could be eliminated and a clearance allowed between inner sleeve 80 and piston member 84.

In order to avoid leakage of fluid at the point of exit from the cylinder of piston sleeves 84b, the outer edge of cap 92 and the inner edge of cap 94 are provided with outwardly and inwardly opening circumferential grooves, respectively, containing O rings 118 and 120 which extend into contact with and seal against the opposite sides of the piston member. When it is desired to retract the extended piston member 84, fluid flows through hose 104 into the top of the upper chamber 108 and out of the bottom of the lower chamber 106 through hose 102. The top portion of bearing stop ring 85, in addition to providing a stop limiting the extension of actuator 35, as well as the shoulder flange opposite the face on piston head 84a, provides a piston face for the fluid flowing into the actuator through hose 104. The smaller working area is compensated for by the effect of gravity on the platform acting to tend to retract the actuator. Thus, the fluid entering the actuator through hose 104 pushes the piston face of bearing stop ring 85 and the back flange of piston head 84a downward, retracting the piston member into the actuator as fluid flows out of the lower chamber 106 through hose 102. In this manner by reversing the flow of fluids in hoses 102 and 104, the actuators are extended and retracted to produce movement of the platform.

The piston member in the actuator is arranged to resist buckling under load by making it tubular rather than a rod of the same cross sectional area. Nevertheless, the piston area is not the full diameter of the tube and in fact is much less than this by making the cylinder and hence the piston head annular. By keeping the spacing between the inner and outer sleeves small, the fluid volume required to move the actuator is much reduced. For illustration, the relative sizes of the structure in each actuator for one arrangement of the simulator may comprise an unextended actuator of 8 feet length having an extension of 5 feet with the inner diameter of the outer sleeve being 6¾ inches, the outer diameter of the inner sleeve being 6 inches and the outer diameter of the lesser wall thickness portion of the piston member being 6½ inches. In this arrangement the platform may weigh approximately 2,500 pounds, and the actuator may have a maximum piston velocity of 60 inches/second produced by a 100 horsepower hydraulic power supply operating all the pistons.

Figures 16, 17, 18:
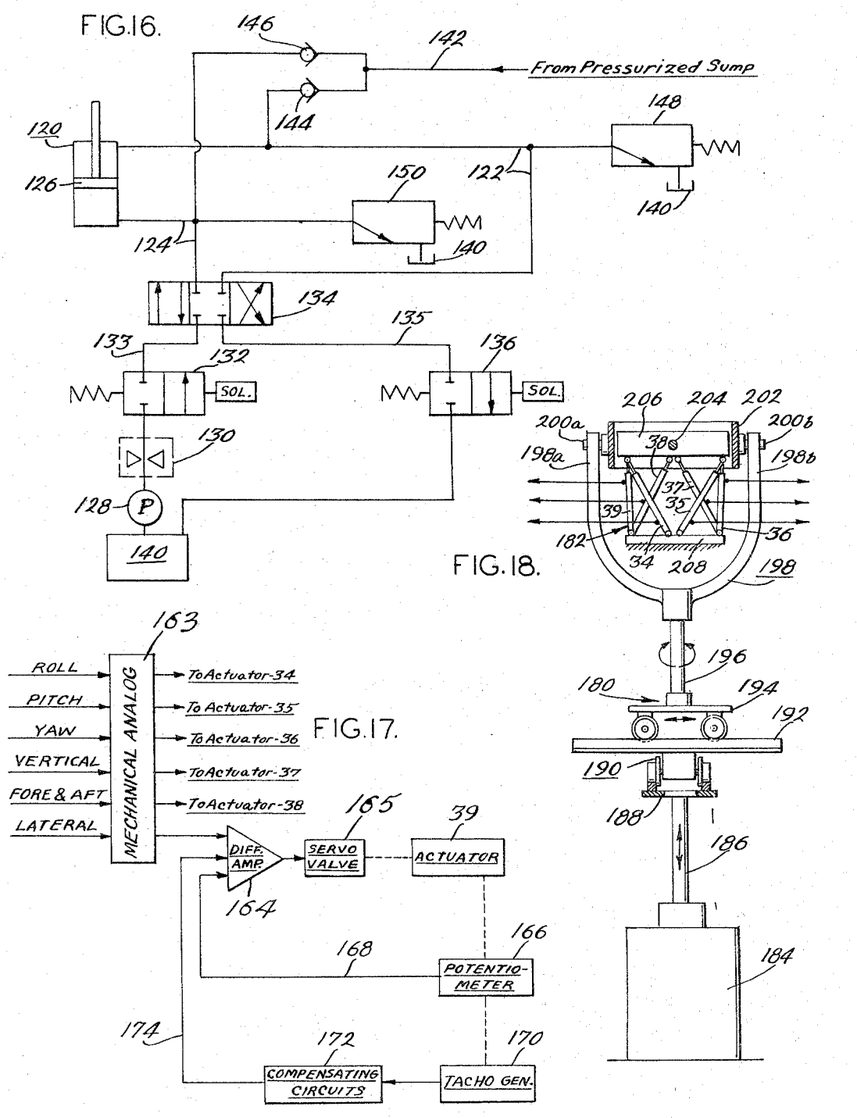
FIG. 16 is a schematic hydraulic flow diagram of the apparatus for actuating the linear actuators of the present invention.
FIG. 17 is a schematic diagram illustrating one form of a mechanical analog for an uncoupled-motion dynamic simulator connected at its inner gimbal to an analog of the present invention.
FIG. 18 is a schematic circuit diagram of the system for converting from movement of the analog of FIG. 17 to movement of the actuators of the present invention.

FIG. 16 illustrates one hydraulic system for an actuator of the present invention. The system shown is illustrative of the hydraulic system for each of the actuators, each actuator having a separate hydraulic system corresponding thereto. In FIG. 16 there is schematically shown a hydraulic actuator cylinder 120 with two supply lines 122 and 124 connected thereto on opposite sides of piston 126 for supplying fluid to move the piston 126 in the actuator cylinder 120. The fluid is pumped into the hydraulic system from hydraulic pump 128 which moves the fluid through restriction 130 to provide the desired maximum velocity of the fluid flowing through the system. The fluid from restriction 130 passes through solenoid controlled shut-off valve 132 which is opened when energized to allow flow therethrough, but in case of power failure will be actuated closed for disconnecting automatically the supply line. The fluid passing through valve 132 is coupled by fluid pressure supply line 133 to the pressure input connection of a four-way servo valve 134. The valve selectively channels the flow of fluid to the cylinder at one side or the other of piston 126 through supply line 122 or 124. The opposite side of the cylinder is connected to the drain or sump line 135 through servo valve 134. A solenoid controlled two-position shut-off valve 136 is connected in drain line 135 between the output port of the servo valve 134 and the sump 140. Solenoid shut-off valve 136 is maintained in an open position when energized providing a through path to sump 140, which serves as a reservoir for the fluid in the hydraulic system from which pump 128 is supplied. In order to maintain proper pressure of the fluid flowing into the system, there is provided a supply line 142 from the pressurized sump 140, the supply line being divided to connect to supply lines 122 and 124 through check valves 144 and 146, respectively, which allow flow from the pressurized sump in the event the pressure drops below a predetermined minimum level upon failure of the system while the actuator is in motion. There is also incorporated into the system two relief valves 148 and 150 connected to supply lines 122 and 124, respectively, so as to protect the cylinder 120 in case of failure of the servo valve 134. In case of power failure all of the actuators will be locked and the supply lines would be depressurized automatically. The pressure in the system may be on the order of 2,000 pounds per square inch. With this medium pressure, relatively low volume system, standard petroleum-base fluid may be used as the actuating fluid.

In operation of the system of FIG. 16, when it is desired to extend piston 126 in cylinder 120, a command signal is given to actuate servo valve 134 to connect fluid pressure supply line 133 with supply line 124 and drain line 135 with supply line 122. Consequently, the main supply line will supply fluid through supply line 124 to raise piston and supply line 122 connected to drain line 135 allows the fluid in the upper chamber of the cylinder to be discharged to the sump. When the desired extension is reached, the servo is cut off disconnecting the main supply line.

When it is desired to retract piston 126 in cylinder 120, the servo valve 134 is moved to connect the fluid pressure supply line 133 with supply line 122 and drain line 135 with supply line 124. By this connection, the fluid pumped through the fluid pressure supply line is channeled through supply line 122 to the cylinder above the piston, thereby driving the piston downwardly, the fluid from the lower chamber being forced out through supply line 124 and drain line 135 to sump 140. After the piston reaches the desired position, the solenoid valve is de-energized and returned to neutral position.

Whenever the servo valve 134 is in neutral position the equal pressure that is supplied to both sides of the piston from the pressurized sump supply assures that the piston maintains its selected position within the cylinder.

Platform 33 which is manipulated to simulate movements, such as would be encountered in helicopter maneuvers or in space flight, may have a wide variety of forms. As shown in FIGS. 2, 3 and 4, platform 33 has a generally irregular hexagonal-shaped outer periphery with a large opening through the center forming an inner hexagonal-shaped periphery. The platform provides a gimbal mount within housings 152 for shaft 154. Shaft 154 supports capsule 156 and provides an axis of rotation for a gross pitch motion of the capsule. Capsule 156 may be of any of the types commonly in use in testing durability and physical and mental reactions of astronauts under space flight conditions. The capsule may have any shape which would fit within the inner periphery of the hollow platform 33 and be capable of generally 90° of rotation about its gimbal mount, as shown in FIGS. 2 and 3, without striking the platform. The capsule would ordinarily be provided with a crew compartment (not shown). The capsule may be driven about shaft 154 by any convenient means such as a motor or hydraulic chain drive or the like (not shown). In this manner, additional pitch of the capsule is provided over that achieved by movement of linear actuators supporting the platform.

Figure 14:
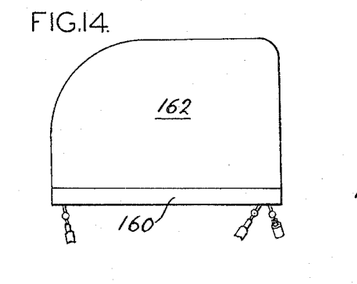
FIG. 14 illustrates another embodiment of the platform and capsule.
Figure 15:
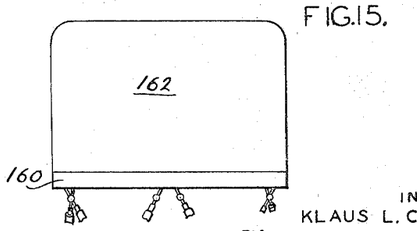
FIG. 15 is a front elevational view of the embodiment of the platform and capsule shown in FIG. 14.

As previously stated, the platform may have a wide variety of forms and may support a number of different types of compartments. Particularly important is a compartment for simulating helicopter flight conditions. As shown in FIGS. 14 and 15, the platform 160 supported by the actuators has a semi-elliptical shape supporting a compartment 162 having a flat rectangular-shaped front extending back to be inwardly and downwardly curved to the periphery of the platform, as is typical in helicopter cockpits. Such a capsule and platform arrangement as described in regard to FIGS. 14 and 15 may be used with simulators producing movements encountered in helicopter flight.

Figure 6:
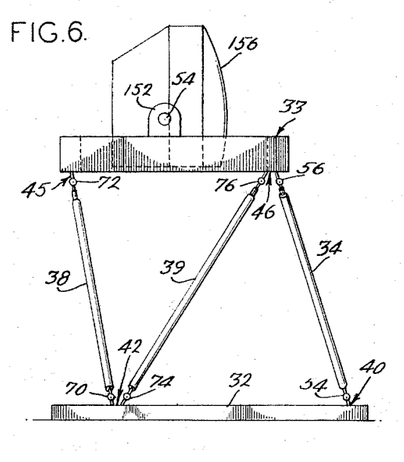
FIG. 6 is a schematic side elevational view similar to FIG. 3 of the present invention.
Figure 7:
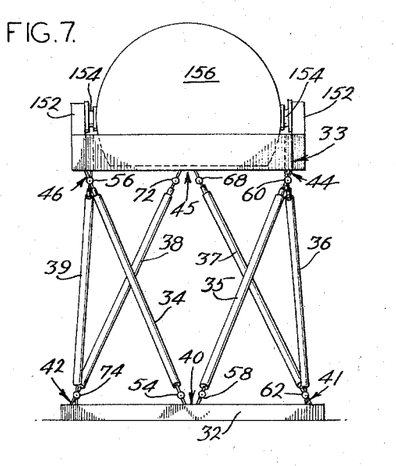
FIG. 7 is a schematic front elevational view similar to FIG. 4.
Figure 8:
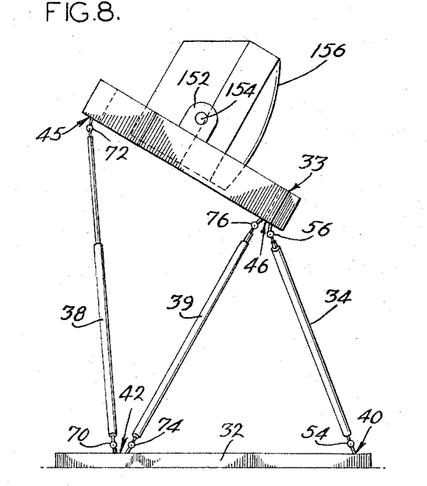
FIG. 8 is a schematic representation of the present invention illustrating one possible extension of the linear actuators for simulated movement of the platform.
Figure 9:
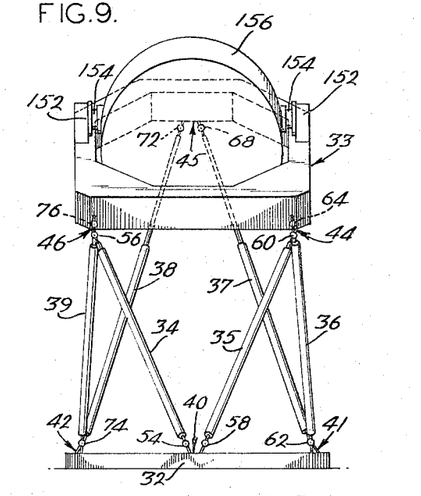
FIG. 9 is a front elevational view of the platform position and linear actuators shown in FIG. 8.
Figure 10:
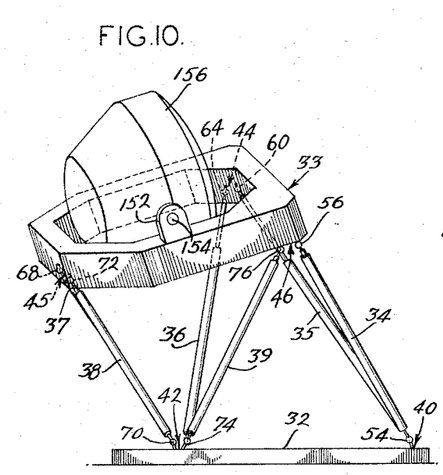
FIG. 10 is a schematic view of the present invention illustrating another possible extension of the linear actuators for simulated movement of the platform.
Figure 11:
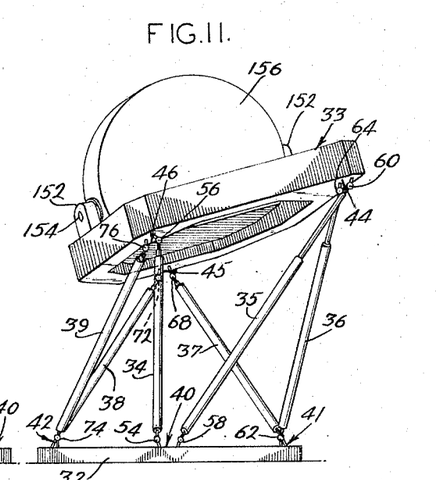
FIG. 11 is a front elevational view of the platform position and linear actuators shown in FIG. 10.
Figure 12:
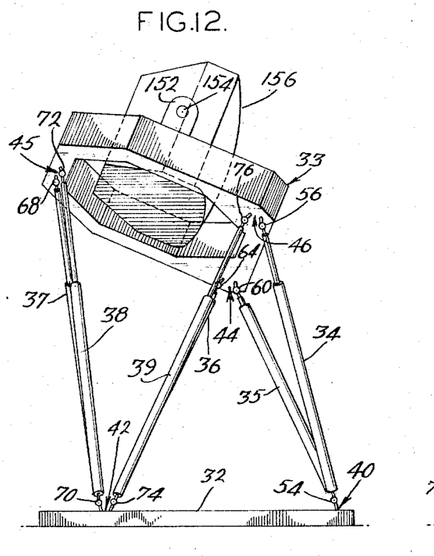
FIG. 12 is a schematic side elevational view of the invention illustrating still another possible extension of the linear actuators for simulated movement of the platform.
Figure 13:
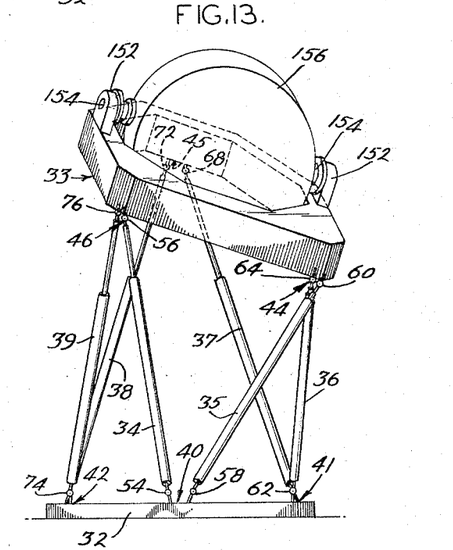
FIG. 13 is a front elevational view of the platform position and linear actuators shown in FIG. 12.

As previously described, the linear actuators may be extended in various combinations to simulate movement of the platform to various positions with respect to the base, thereby simulating fore and aft, lateral, elevational, roll, pitch or yaw movement, or any combination of these movements. Since the present invention employs a highly coupled system with the linear actuators, all actuators may be displaced upon movement of any of them even if the particular actuator is one which is not extended or retracted to produce the desired movement. FIGS. 6 and 7 are schematic illustrations of the motion simulator of the present invention showing a side elevational view and a front elevational view, respectively, similar to views in FIGS. 3 and 4. In FIGS. 8 and 9 there is shown a side elevational view and a front elevational view, respectively, of the motion simulator in which actuators 37 and 38 have been extended equal distances to produce movement which simulates primarily a pitch motion. FIGS. 10 and 11 illustrate side elevational and front elevational views, respectively, of the simulator with actuators 35 and 36 extended to produce a combination of rotational movements of the platform. Still another position of movement of the platform is shown in the side elevational and front elevational views in FIGS. 12 and 13, respectively, where all of the actuators have been extended different lengths to produce a complex movement of the platform which is a combination of the movements capable of being produced by the simulator.

In order to determine accurately the movements of the actuators for producing any of the three linear movements or any of the three rotational movements associated with the three mutually perpendicular axes of a reference frame, coordinate conversion between the coupled system, such as employed in the present invention, and the reference frame is necessary. The coordinate conversion is accomplished reliably, simply and inexpensively by use of a mechanical analog conversion system. In the mechanical analog the geometric arrangement of a set of six transducers fixed at one end to a reference plane and at the other end to a movable platform is exactly similar but reduced in scale to the arrangement of the six actuators of the motion simulator. As the analog platform is manipulated, its supports corresponding to the actuators extend and retract in a manner directly analogous to the manner in which the actuators extend and retract in the actual simulator in assuming the desired positions. As shown in FIG. 17, the outputs of a mechanical analog 163 are in terms of signals representative of the extensions or retractions of the supports of the model corresponding to the actuators driven by that signal in the actual platform. The amount that each of the six linear actuators should be extended or retracted in order to produce the desired movement of the platform in accordance with movement in the uncoupled system is thus produced by the combination of signals. The mechanical analog to be explained fully hereafter is of an uncoupled motion system. Any one or any combination of the six degrees of individual movement, roll, pitch, yaw, vertical, fore and aft, and lateral, are the inputs to the mechanical analog. Each of the six outputs of the mechanical analog corresponds to the actuation required for an associated actuator in the coupled motion system of the present invention.

In FIG. 17 one complete actuator system connected to the mechanical analog is shown for simplicity, the actuator system for actuator 39; the other five actuator systems are similar in arrangement. The output of the mechanical analog associated with actuator 39 is connected to a differential amplifier 164, which provides an amplified signal for actuation of the servo valve 165 in the proper direction for extension or retraction of actuator 39, as previously described in regard to the servo valve and hydraulic system of FIG. 16.

A potentiometer 166 is mechanically coupled to the piston member in the actuator for providing an error signal feedback loop 168 to the differential amplifier 164 indicating the present position of the piston member with respect to a fixed reference level in the actuator. The difference signal between that feedback from the potentiometer and the output from the mechanical analog is amplified through the differential amplifier for controlling the servo valve to have the piston member extended or retracted the ramining desired distance.

A tachometer generator 170 is also mechanically coupled to the piston member of the actuator along the same mechanical coupling as the potentiometer for providing an output signal indicative of the speed at which the piston member is being moved. The latter output signal is supplied to compensating circuits 172. The compensating circuits have a non-linear transfer characteristic such that a higher gain is provided for large input signals than for small input signals. The output of the compensating circuits is connected through feedback loop 174 to the differential amplifier 164. The differential amplifier provides an output signal which is the difference signal between the signals from the mechanical analog and the potentiometer, the difference signal being summed with the signal from the compensating circuits. By this circuit arrangement, additional speed of movement of the piston member is provided during the initial phases of movement thereof, the speed of movement being decreased as the desired extension or retraction of the piston member is approached.

A representation of one possible form of the mechanical analog 163 is illustrated schematically in FIG. 18, which shows an uncoupled motion system generally designated 180 mechanically coupled to an analog model of a coupled motion system 182 of the present invention. The uncoupled motion system 180 comprises generally a support base 184 which includes an apparatus, such as electric servo motor, for raising and lowering vertical shaft 186. Vertical shaft 186 supports a horizontally extending track 188 on which rides carriage 190 which thereby moves only in the direction of the extension of its track. Carriage 190 supports thereon a horizontally extending track 192 which extends perpendicular to the direction of movement of carriage 190. A carriage 194 on track 192 is guided thereby to move only in the direction of the track. The carriage 194, in turn, supports a vertically extending shaft 196, which is rotatable about its vertical axis. Vertically extending shaft 196 supports at its upper end a yoke 198, which provides a gimbal mount atop yoke arms 198a and 198b to receive trunnions 200a and 200b, respectively, supporting ring 202 for rotation about the horizontal trunnion axis. Across a second diameter of ring 20 perpendicular to the trunnion axis, a trunnion 204 rotatably supports platform simulating dics 206. Any of the possible uncoupled linear or rotational movements change the position of the platform disc 206 which is the heart of the analog model to which the transducer elements analogous to the actuators on the actual platform are coupled at one end. The transducer elements are coupled at their other end to base 208, which is fixed by struts or other suitable supports (not shown) to ground or structure fixed o ground like base 184. The transducers are shown in an arrangement similar to the arrangement of the actuators in FIG. 7 and are numbered correspondingly to those actuators. Each transducer is electrically connected to a system such as described with actuator 39 in FIG. 17. The signal from each transducer is indicative of the amount its associated actuator should be extended or retracted. The transducers may be sliding tap resistance strips connected across a source of power and providing a voltage output at the tap indicative of the position of a movable tap along the resistance strip.

The uncoupled motion analog of FIG. 18 provides a system wherein linear movement of selected direction, amount and velocity, may be made along any one or any combination of the three mutually perpendicular axes provided by shaft 186, carriage 190 and carriage 194. By proportioning these movements to the scale of the model relative to the platform, the platform may therefore be positioned at any selected three dimensional coordinate position. The uncoupled rotational movements about the axes of shaft 196, trunnions 200a and 200b and trunnion 204, respectively, may be individually selected to cause the platform to follow the analog in its rotation about individual or combined axes alone or superimposed on linear movements. The movement of the elements of the uncoupled motion analog may be performed manually or by small servo drives associated with each of the elements for actuating changes in relative position of the elements. In actual use the command signals to the six servo drives would be received from a computer which in turn receives command inputs from various sources, one of which may be an operator on the motion simulator.

It will be observed that the present invention provides a light platform position simulator and one which may be transported to desired locations after fabricated since there are no rigid lateral columns and large supporting foundation. Moreover, the platform not only provides flexibility of movement but permits rapid and accurate movement in response to command signals coupled from the mechanical analog. The arrangement of the six linear actuators in an octahedron configuration provides stability and economy of space.

While the invention has been described with particular reference to a specific embodiment thereof, it will be understood that it may be embodied in a large variety of forms different from the one specifically shown and described without departing from the scope and spirit of the invention as defined by the appended claims.

I claim:

1. A motion simulator capable of motion in all six degrees of freedom, three linear and three rotational, or any combination thereof, comprising:
   a platform providing three points in a plane;
   a supported base defining three points in another plane; and
   six powered and controlled extensible numbers each connected at one end to the support base and at the other end to the platform and connecting adjacent points of the support base and platform for providing any of said motions by said platform by selective changes in length of said extensible members, said extensible members and lines in the platform and support base, respectively, drawn between points defining edges of an octahedron having only triangular faces.

2. A motion simulator capable of motion in all six degrees of freedom, three linear and three rotational, or any combination thereof, comprising:
   a platform providing generally three points in a plane;
   a support base providing generally three points in another plane such that the points on said base and platform define vertices of a hexagon when projected vertically on one of said planes; and
   six powered and controlled extensible members each connected at one end to the support base and at the other end to the platform and connecting adjacent points of said base and said platform for providing any of said motions by said platform by selective changes in length of said extensible members, said extensible members and lines in said platform and support base, respectively, drawn between points generally defining edges of an octahedron having only triangular faces.

3. A motion simulator capable of motion in all six degrees of freedom, three linear and three rotational, or any combination thereof, comprising:
   a platform defining three points in a plane;
   a support base defining three points in another plane; and
   six powered and controlled extensible members connected in pairs at one end on each of said three points of said base, each member of said pair being connected adjacent the other member of that pair; said extensible members connected in pairs to said base having the other ends of each pair respectively connected at the nearer of two of the three points on said platform such that each point on said base and platform have a pair of extensible members connected thereat adjacent each other, said extensible members providing any of said motions by said platform by selective changes in length of said extensible members, said extensible members and lines in said platform and support base drawn between points generally defining edges of an octahedron having only triangular faces.

4. The motion simulator of claim 3 in which said extensible members each comprise a telescopic tubular member slidable along a first support element located within said tubular member and slidable within a second support element, said tubular member providing a piston face, said motion similator further comprising hydraulic means connectable to each of said extensible members for exerting force against said piston faces for extending said extensible members.

5. The motion simulator of claim 4 in which each of said tubular members includes another piston face; said first-mentioned piston face and said other piston face being associated with respective extension and retraction of said tubular members; said hydraulic means being coupled to each of said extensible members at two positions, one above maximum upward movement of said other piston face and another below maximum downward movement of said first-mentioned piston face.

References Cited by the Examiner
UNITED STATES PATENTS

| | | |
|---|---|---|
| 1,789,680 | 1/1931 | Gwinnett. |
| 2,695,783 | 11/1954 | Serafin. |
| 2,924,028 | 2/1960 | Geisse _____________ 35—12 |
| 2,930,144 | 3/1960 | Fogarty _____________ 35—12 |
| 2,038,279 | 5/1960 | Hemstreet et al. _______ 35—12 |
| 3,078,594 | 2/1963 | White _______________ 35—12 |
| 3,085,354 | 4/1963 | Rasmussen et al. ______ 35—12 |

EUGENE R. CAPOZIO, *Primary Examiner.*

S. M. BENDER, *Assistant Examiner.*